(12) United States Patent
Moyer (10) Patent No.: US 8,639,895 B2
(45) Date of Patent: Jan. 28, 2014

(54) SYSTEMS AND METHODS FOR MEMORY REGION DESCRIPTOR ATTRIBUTE OVERRIDE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 187 days.

(21) Appl. No.: 13/182,734

(22) Filed: Jul. 14, 2011

(65) Prior Publication Data

US 2013/0019081 A1    Jan. 17, 2013

(51) Int. Cl.
*G06F 12/14* (2006.01)

(52) U.S. Cl.
USPC .................. 711/158; 711/163; 711/E12.096

(58) Field of Classification Search
USPC ............ 711/158, 163, E12.091, E12.096, 711/E12.098
See application file for complete search history.

(56) References Cited

U.S. PATENT DOCUMENTS

| | | | |
|---|---|---|---|
| 4,325,120 A | 4/1982 | Colley et al. | |
| 4,672,538 A | 6/1987 | Takane | |
| 4,774,653 A | 9/1988 | James | |
| 4,949,238 A | 8/1990 | Kamiya | |
| 5,577,230 A | 11/1996 | Argade et al. | |
| 5,649,159 A | 7/1997 | Le et al. | |
| 5,666,509 A | 9/1997 | McCarthy et al. | |
| 5,889,952 A | 3/1999 | Hunnicutt et al. | |
| 6,101,590 A | 8/2000 | Hansen | |
| 6,412,043 B1 | 6/2002 | Chopra et al. | |
| 6,449,699 B2 | 9/2002 | Franke et al. | |
| 6,449,700 B2 | 9/2002 | Hagersten et al. | |
| 6,591,340 B2 | 7/2003 | Chopra et al. | |
| 6,718,426 B2 | 4/2004 | Naya et al. | |
| 6,810,471 B2 | 10/2004 | Fujii | |
| 6,836,836 B2 | 12/2004 | Shinozaki | |
| 7,805,588 B2 | 9/2010 | Bridges et al. | |
| 2002/0065996 A1 | 5/2002 | Garnett et al. | |
| 2002/0199076 A1 | 12/2002 | Fujii | |
| 2003/0135709 A1 | 7/2003 | Niles et al. | |
| 2003/0191846 A1 | 10/2003 | Hunnicutt et al. | |
| 2004/0049600 A1 | 3/2004 | Boyd et al. | |

(Continued)

FOREIGN PATENT DOCUMENTS

WO    9849623    2/1998

OTHER PUBLICATIONS

U.S. Appl. No. 13/249,829, filed Sep. 30, 2011 having inventors William C. Moyer et al.

(Continued)

*Primary Examiner* — Hal Schnee (57) ABSTRACT

A memory protection unit (MPU) is configured to store a plurality of region descriptor entries, each region descriptor entry defining an address region of a memory, an attribute corresponding to the region, and an attribute override control corresponding to the attribute. A memory access request to a memory address is received and determined to be within a first address region defined by a first region descriptor entry and within a second address region defined by a second region descriptor entry. When the attribute override control of the first region descriptor entry indicates that override is to be performed, the value of the attribute of the first region descriptor entry is applied for the memory access. When the attribute override control of the second region descriptor entry indicates that override is to be performed, the value of the attribute of the second region descriptor entry is applied for the memory access.

19 Claims, 7 Drawing Sheets

(56) References Cited

U.S. PATENT DOCUMENTS

| | | | |
|---|---|---|---|
| 2006/0149911 A1* | 7/2006 | Kimelman et al. | 711/163 |
| 2007/0011419 A1 | 1/2007 | Conti | |
| 2007/0079093 A1* | 4/2007 | Axford et al. | 711/163 |
| 2007/0277009 A1 | 11/2007 | Anschel et al. | |
| 2008/0163353 A1 | 7/2008 | Conti | |
| 2008/0250228 A1 | 10/2008 | Elliott et al. | |
| 2008/0306954 A1 | 12/2008 | Hornqvist | |
| 2009/0007219 A1 | 1/2009 | Abzarian et al. | |
| 2009/0138963 A1* | 5/2009 | Sato et al. | 726/17 |
| 2009/0204777 A1* | 8/2009 | Norman | 711/163 |
| 2010/0107243 A1 | 4/2010 | Moyer et al. | |

OTHER PUBLICATIONS

U.S. Appl. No. 13/033,317, filed Feb. 23, 2011, having inventors William C. Moyer et al.
U.S. Appl. No. 13/033,327, filed Feb. 23, 2011, having inventors William C. Moyer et al.
Non-Final Office Action mailed Jun. 21, 2013 for U.S. Appl. No. 13/033,327, 27 pages.
Non-Final Office Action mailed Dec. 20, 2012 for U.S. Appl. No. 13/033,317, 17 pages.
Non-Final Office Action mailed Sep. 12, 2013 for U.S. Appl. No. 13/249,829, 52 pages.
MCF5301x Reference Manual, Aug. 2009, Freescale Semiconductor, Inc.; Rev. 4; Document No. MCF53017RM; Chapter 13 "Memory Protection Unit (MPU)"; 40 pages.
Power PC e500 Core Family Reference Manual; Apr. 2005; Freescale Semiconductor, Inc.; Rev. 1; Chapter 2.12; 15 pages.
Power PC Microprocessor Family: The Bus Interface for 32-Bit Microprocessors; Jan. 2004; Freescale Semiconductor, Inc.; Rev. 1; Chapter 2.5.4; 12 pages.
Final Office Action mailed Jul. 7, 2013 for U.S. Appl. No. 13/033,317, 14 pages.

* cited by examiner

FIG. 1

| FIELD | COMMENTS |
|---|---|
| V | VALID BIT FOR ENTRY |
| UPPER_BOUND | UPPER ADDRESS BOUND (COMPARED AGAINST EFFECTIVE ADDRESS) |
| LOWER_BOUND | LOWER ADDRESS BOUND (COMPARED AGAINST EFFECTIVE ADDRESS) |
| INST | INSTRUCTION OR DATA ACCESS ENTRY (1=INST) |
| SX | SW | SR | SUPERVISOR EXECUTE, WRITE, AND READ PERMISSION BITS |
| UX | UW | UR | USER EXECUTE, WRITE, AND READ PERMISSION BITS |
| CIOVR | CACHE-INHIBITED OVERRIDE ATTRIBUTE |
| GOVR | GUARDED OVERRIDE ATTRIBUTE |
| CI | CACHE-INHIBITED ATTRIBUTE |
| G | GUARDED ATTRIBUTE (NOT PRESENT IN DEDICATED INST ENTRIES) |

SYSTEMS AND METHODS FOR MEMORY REGION DESCRIPTOR ATTRIBUTE OVERRIDE

CROSS-REFERENCE TO RELATED APPLICATIONS

The present application is related to co-pending U.S. patent application Ser. No. 13/033,317, entitled "Memory Protection in a Data Processing System," and filed on Feb. 23, 2011 the entirety of which is incorporated by reference herein.

The present application is related to co-pending U.S. patent application Ser. No. 13/033,327, entitled "Remote Permissions Provisioning For Storage In A Cache And Device Therefor," and filed on Feb. 23, 2011, the entirety of which is incorporated by reference herein.

FIELD OF THE DISCLOSURE

The present disclosure relates generally to data processing systems, and more particularly to providing memory protection services in data processing systems.

BACKGROUND

Some embedded processors implement an internal Memory Protection Unit (MPU) to provide protection information for a number of variable size memory regions. Regions of memory can be write protected, as well as restricted to supervisor mode only by the MPU. These access protections are enforced on instruction fetches and data read and write accesses by comparing these access addresses with each entry in the MPU to determine a match.

Matching descriptors provide stored protection attributes which selectively allow or deny the access, and also contain memory attributes of cache-inhibited (CI) and "Guarded" (G). Due to cost concerns, the total number of region descriptors is limited, and may be overly restrictive for some memory maps.

BRIEF DESCRIPTION OF THE DRAWINGS

The present disclosure may be better understood, and its numerous features and advantages made apparent to those skilled in the art, by referencing the accompanying drawings.

DETAILED DESCRIPTION

FIGS. 1-9 illustrate embodiments of systems and methods for overriding default policies for setting memory access attributes in a data processing system to enable overlapping memory regions. With overlapping region descriptors, default policy override logic determines permissions and memory attributes when multiple region descriptors match a given access type. By providing an access attribute override capability, the number of descriptors necessary for a particular memory map can be reduced.

Figure 1:
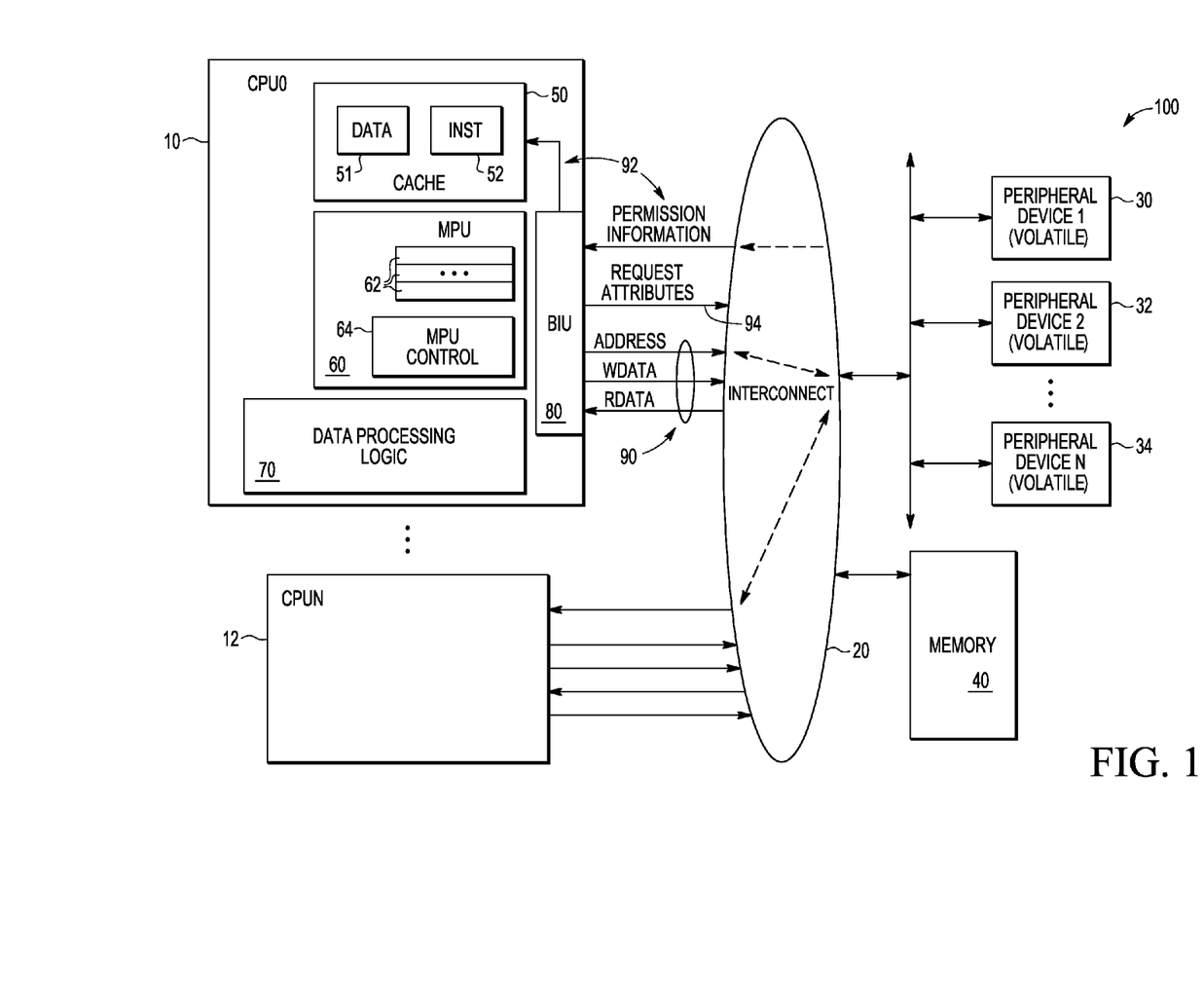
FIG. 1 is a block diagram illustrating a data processing system in accordance with a specific embodiment of the present disclosure.

FIG. 1 is a block diagram illustrating a data processing system 100 in accordance with a specific embodiment of the present disclosure. Data processing system 100 includes a first processor core 10 identified as CPU 10, a second processor core 12 identified as CPU N, an interconnect 20, memory device 40, and volatile and non-volatile peripheral devices 30, 32, 34. The processor core 10 includes a cache 50, which further includes a data cache 51 and an instruction cache 52; a MPU 60, which further includes region descriptors 62 and a MPU control module 64; a data processing logic module 70; and a bus interface unit (BIU) 80. The processor core 12 includes similar sub-components (not shown), and each processor core can include additional modules (not shown for clarity).

Memory access and override policies can be implemented by one or more memory protection units (MPUs) 60 included in data processing system 100. During operation of the data processing system 100, data processing logic module 70 at a processor core 10, 12 may issue a request to access a location in memory 40. For example, the data processing logic module 70 may issue a request to retrieve a program instruction or data information from memory 40, or to store data information to memory 40. Memory access and override policies determine whether to allow or deny the requested access. If two descriptors have overlapping address ranges in an area in memory and have conflicting access policies, a default access policy can be overridden, in order to reduce the number of region descriptors required by access requests which fall within the ranges defined by the descriptors.

In the embodiment illustrated at FIG. 1, the data processing system 100 is a general purpose data processing device that can be incorporated into any of a number of electronic systems, including portable electronic devices, computer devices, automotive devices, communications devices, and the like. The processor cores 10,12 include circuitry configured to execute software and thereby perform a desired task.

A memory access request is typically associated with execution of a load instruction to retrieve information from a particular location in memory 40, or execution of a store instruction to write information to a particular location in memory 40. An address accompanies the memory access request to identify a location within a memory to be accessed. A load or store instruction can be included in a software program, and the software program can be executed in a supervisor mode or in a user mode. The execution of a software program can be referred to as a process, and a read or write access request can be associated with a process identifier (PID) assigned to the particular process being executed.

Information accessed during a memory read operation can include instructions or can include data information, while information associated with a memory write operation is generally data information. Accordingly, memory access requests can be characterized based on values of one or more request attributes. Examples of request attributes include an address attribute for indicating an address of a location to be accessed; a read attribute for indicating a request is a read request; a write attribute for indicating a request is a write request; a supervisor attribute for indicating a request is issued in supervisor mode; a user attribute for indicating a request is issued in user mode, a process identification (PID) attribute for identifying a process associated with a request; an instruction attribute for indicating that requested information is an instruction; and the like. Any number of request attributes can be included in region descriptors 62 and associated with a memory access request.

As used herein, a memory location is intended to refer to any data storage location having a unique system address. Such locations, including memory devices 40, peripheral devices 30, 32, 34, and the like, are included within a system address space. Similarly, the phrase memory access request is used herein to refer to any request to access a storage location based on a unique system address. For simplicity, memory-mapped storage locations and corresponding access requests described herein are referred to as memories and memory access requests, respectively.

Processor cores 10, 12 can communicate with the memory 40 and peripherals 30-34 via the interconnect 20. In particular, interconnect 20 may conduct signals to provide REQUEST INFORMATION 90, PERMISSION INFORMATION 92, and REQUEST ATTRIBUTES 94. The REQUEST INFORMATION 90 includes a memory address (ADDRESS), write data (WDATA), and read data (RDATA). The memory device 40 can provide storage locations accessible via memory access requests issued by the processor core 10 or the processor core 12. The memory device 40 can include any of a variety of memory types, including dynamic random access memory (DRAM), static random access memory (SRAM), and the like. For clarity, FIG. 1 omits other components of the data processing system 100 whose operation is well known to those of ordinary skill in the art, such as high-level cache memory devices, external interfaces, and the like. Furthermore, the data processing system 100 can include a greater or a fewer number of processor cores.

During operation, processor cores 10 and 12 can access the memory 40 to obtain instructions, to retrieve data information, or to store data information. For example, the data processing logic module 70 at the processor core 10 may issue a memory access request to retrieve data information at a particular memory address at the memory 40. Before transmitting the memory access request external to the processor core 10, MPU 60 can determine if the requesting device (or the software process from which the request originates) possesses suitable permissions to allow the access. Furthermore, the processor core 10 can determine whether the desired data information is available within the data cache 51. If the MPU 60 determines that the request is allowed, and the desired data information is not present at the data cache 51 (a cache miss), the memory access request is provided to the BIU 80. The BIU 80 is configured to forward the memory access request over the interconnect 20 to the memory 40 or peripherals 30, 32, 34.

The BIU 80 can initiate a memory-read access request by transmitting a memory address via signal ADDRESS, a read command signal (not shown), and the REQUEST ATTRIBUTES 94 identifying values of other attributes associated with the request. These signals are propagated via the interconnect 20 to the memory 40. Memory device 40 can return the requested data information to the BIU 80 and then data processing logic module 70 via the signal RDATA over the interconnect 20.

In a similar manner, the data processing logic module 70 at the processor core 10 may issue a memory access request to store data information to a particular memory address at the memory 40. Before transmitting the memory access request external to the processor core 10, MPU 60 can determine whether to allow or deny the access based on values of request attributes associated with the request. If the MPU 60 determines that attributes accompanying the request meet the requirements of attributes maintained by the MPU 60, the memory access request is provided to the BIU 80.

The BIU 80 can initiate a memory-write access request by transmitting a memory address via signal ADDRESS, the data information to be stored at the memory 40 via the signal WDATA, a write command signal (not shown), and the REQUEST ATTRIBUTES 94 identifying privileges associated with the request.

A memory access request to read or to write to the memory 40 can include additional information that can be communicated to the memory 40 via the signal REQUEST ATTRIBUTES 94 to indicate various request attributes associated with the access request. The REQUEST ATTRIBUTES 94 can include information identifying the source of the request and the type of the request, as described above. For example, the REQUEST ATTRIBUTES 94 can include an indication that the request is associated with a process running in supervisor mode or user mode, an indication that the request is to perform a read operation or a write operation, and the like. The REQUEST ATTRIBUTES 94 can include other information that can further characterize an associated memory access request in a particular way.

As described above, a MPU, such as the MPU 60 can maintain respective permission information associated with one or more address regions. The MPU 60 enforces protections on instruction fetches and data read and write accesses by comparing a memory address associated with the memory access request with each entry in the MPU 60 (stored within a region descriptor 62) to determine a match. If the MPU 60 identifies a region descriptor 62 corresponding to the memory address, attributes included in that region descriptor 62 can be evaluated. Attributes can relate to any number of request attributes that together define aspects of a protection policy. For example, a region descriptor can designate that locations included within a particular memory address region are write protected, in which case a request to store information, e.g., a request with an attribute that indicates information is to be stored, at a location within the region is denied while a request to retrieve information, e.g., a request with an attribute that indicates information is to be read, from a location within the region is allowed. Similarly, a region descriptor 62 can designate that locations included within a memory address region are accessible only to access requests associated with an attribute that indicates the access request was issued by a process running in supervisor mode.

Figure 2:
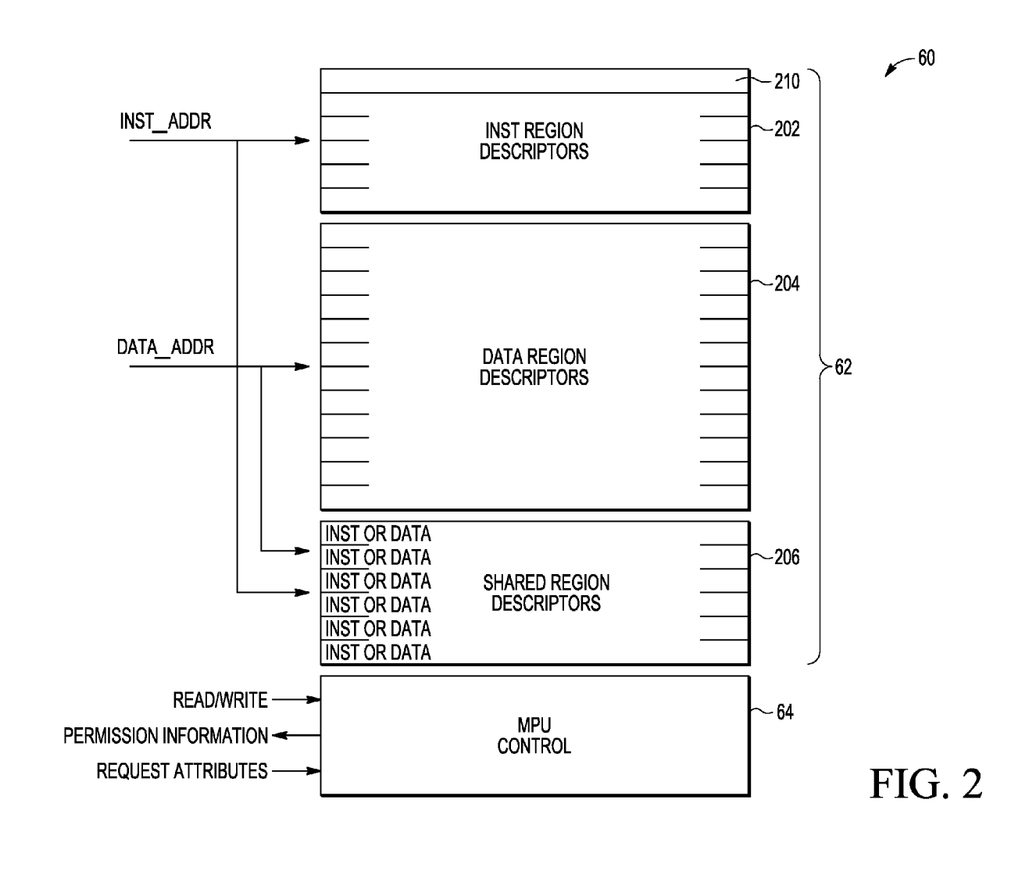
FIG. 2 is a block diagram of a memory protection unit (MPU), such as the MPUs included at the data processing system in FIG. 1, in accordance with a specific embodiment of the present disclosure.
Figure 3:
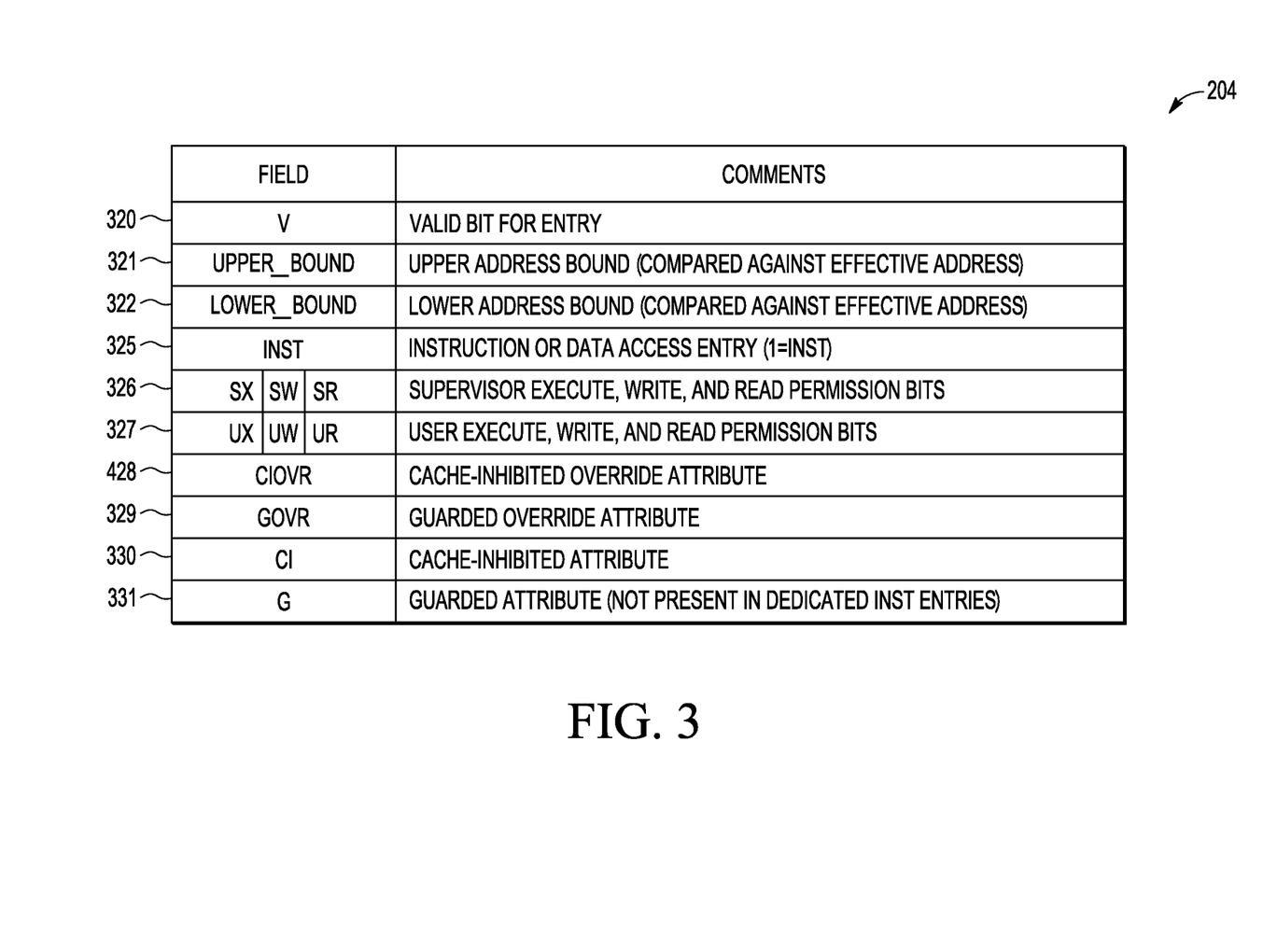
FIG. 3 is a table illustrating a region descriptor, such as a region descriptor shown at FIGS. 1-2, in accordance with a specific embodiment of the present disclosure.

The operation of MPU 60 may be better understood with reference to FIGS. 2 and 3. FIG. 2 is a block diagram illustrating a MPU 60 in accordance with a specific embodiment of the present disclosure. The MPU 60 includes a set of instruction region descriptors 202, a set of data region descriptors 204, and a set of shared (instruction and data) region descriptors 206. The MPU 60 also includes a MPU control module 64. The MPU control module 64 operates to selectively allow or deny each requested memory access based on an address and privilege attributes associated with the request, based on whether the access is a read access or a write access, and based on one or more region descriptors included in region descriptors 202, 204, and 206. As previously described, the REQUEST ATTRIBUTES 94 can include an indication of whether the device or software process initiating the access request has supervisor privileges or instead has only user privileges, and may include other attributes, such as a bus master identification number and the like. In response to a successfully completed memory access, the MPU control module 64 can provide permission information associated with the request to the requesting device, e.g., for storage in a cache memory 50 (FIG. 1) as described earlier. If a memory access request is denied, the MPU control module 64 can return a termination error response to the requesting device indicating that a memory access exception has occurred.

FIG. 3 is a table illustrating an embodiment of region descriptors 202, 204, 206 in accordance with a specific embodiment of the present disclosure that includes a plurality of fields, 320-331. Field 320 relates to a validity attribute, V. A region descriptor is invalid if a corresponding valid bit is not asserted. If the valid bit is asserted and the address range associated with the region descriptor includes the address associated with a request, permission information included in the region descriptor can be considered in response to a memory access request.

Fields 321, UPPER BOUND, and 322, LOWER BOUND, relate to an upper-bound address attribute and a lower-bound address attribute, respectively, for indicating a relevant address range of the descriptor.

Field 325 relates to an instruction attribute, INST, which can be asserted to identify that the region descriptor is only valid for instruction accesses, e.g., access requests wherein a corresponding instruction request attribute is also asserted. Accordingly, a corresponding instruction attribute is asserted at region descriptors included in set 202 (instruction region descriptors), and negated in region descriptors included in set 204 (data region descriptors).

Field 326 relates to a plurality of accessibility attributes including a SX attribute (supervisor execute), a SW attribute (supervisor write), and a SR attribute (supervisor read), which can be individually asserted to identify the types of supervisor level access requests that are allowed by the region descriptor to locations included within the address region specified by the region descriptor. For example, if the SW attribute is asserted, an access request identified as both a supervisor access and a write access (by assertion of corresponding request attributes accompanying the request) is permitted by the descriptor to store information to locations within the associated memory address region. Similarly, if the SR attribute is asserted, an access request identified as both a supervisor access and a read access is permitted by the descriptor to read locations with the associated region. Attribute SX identifies whether locations within the associated region can be executed.

Field 327 relates to a plurality of accessibility attributes including a UX attribute (user execute), a UW attribute (user write), and a UR attribute (user read), which individually identify the types of user level access requests that are permitted by the descriptor to locations corresponding to the region descriptor.

Field 328 relates to a cache-inhibit override attribute, CIOVR. The cache-inhibited override attribute can be asserted to override an indication requesting a device to not store information retrieved from locations within the associated region in a cache device, such as data cache 51 and instruction cache 52 of FIG. 1.

Field 329 relates to a guarded override attribute, GOVR. The guarded override attribute can be asserted to override an indication that locations included within the associated region operate differently than a normal memory element or register.

Field 330 relates to a cache-inhibit region attribute, CI. The cache-inhibit region attribute can be asserted to instruct a requesting device to not store information retrieved from locations within the associated region in a cache device, such as data cache 51 and instruction cache 52 of FIG. 1.

Field 331 relates to a guarded region attribute, G. The guarded region attribute can be asserted to indicate that locations included within the associated region operate differently than a normal memory element or register. For example, a memory mapped location whose value can change following or in response to an access, such as a FIFO, a volatile storage element, and the like. Accordingly, information associated with a guarded location typically is not stored in a cache memory device.

The total number of region descriptors is limited, and may be overly restrictive for some memory maps. Use of overlapping regions helps reduce the number of region descriptors needed to provide adequate protection and attribute controls, however permissions and memory attributes must be determined when multiple region descriptors match a given access type. In some embodiments, access can be allowed when any (as opposed to all) matching region descriptor allows the access based on access type and stored permissions in the region descriptor. For the attributes of cache inhibit and for guarded, a default policy of the least restrictive access for cache inhibited regions can be used, and the most restrictive access can be used for guarded regions to cover many of the typical cases which are encountered.

For cases that do not result in an lower number of region descriptors being used even though the default access policies are in place, the cache inhibit override attribute 328 and guarded override attribute 329 can be used to alter the default policy on a per-region basis, thus further minimizing the use of region descriptors by allowing additional opportunities for descriptor address range overlaps. In some embodiments, the GOVR and CIOVR indicators indicate whether a matching access region descriptor uses the G and/or CI settings of a given region descriptor regardless of the settings of any other matching descriptor. Only a single matching descriptor may be allowed to have GOVR or CIOVR set, although it is allowable for two different matching descriptors to each have one of these set which is not set in another matching descriptor. By providing the override capability, the number of region descriptors necessary for a particular memory map can be reduced by changing the attribute to match the corresponding attribute in at least one other matching descriptor.

During operation of MPU 60, an incoming memory access request is evaluated. For example, REQUEST INFORMATION 90 and REQUEST ATTRIBUTES 94 received from BIU 80 can be evaluated to determine an address of a location to be accessed, a PID associated with the request, whether the requesting device or process has supervisor or only user privileges, whether the request is a read access or write access, and whether the request is an instruction access or a data access. Region descriptors 202, 204, 206 can include additional fields corresponding to other request attributes or to identify or further qualify an access request in a desired way. The MPU 60 examines each valid region descriptor 202, 204, 206 to determine if any region descriptor is relevant with respect to the received access request. If the MPU 60 identifies a region descriptor 202, 204, 206 that matches the incoming access request, the MPU either allows or denies the access based on the request attributes and based on permissions specified by the matching region descriptor. For example, if a user-mode request to write to address XYZ is received, and a valid region descriptor defines an address region that includes address XYZ, the requested access can be allowed if the UW attribute is asserted, and denied if the UW attribute is not asserted. Furthermore, if a region descriptor is determined to have governance over an access, the access can be identified as a cache-inhibited access or a guarded access based on the values of the CI and G fields in the descriptor, respectively.

MPU 60 can include more than one region descriptor 62 that matches a particular memory access request. For example, two region descriptors included in MPU 60 can specify memory address regions that overlap so that an address associated with a memory access request can be included within the address bounds defined by both descriptors 62.

Figure 4:
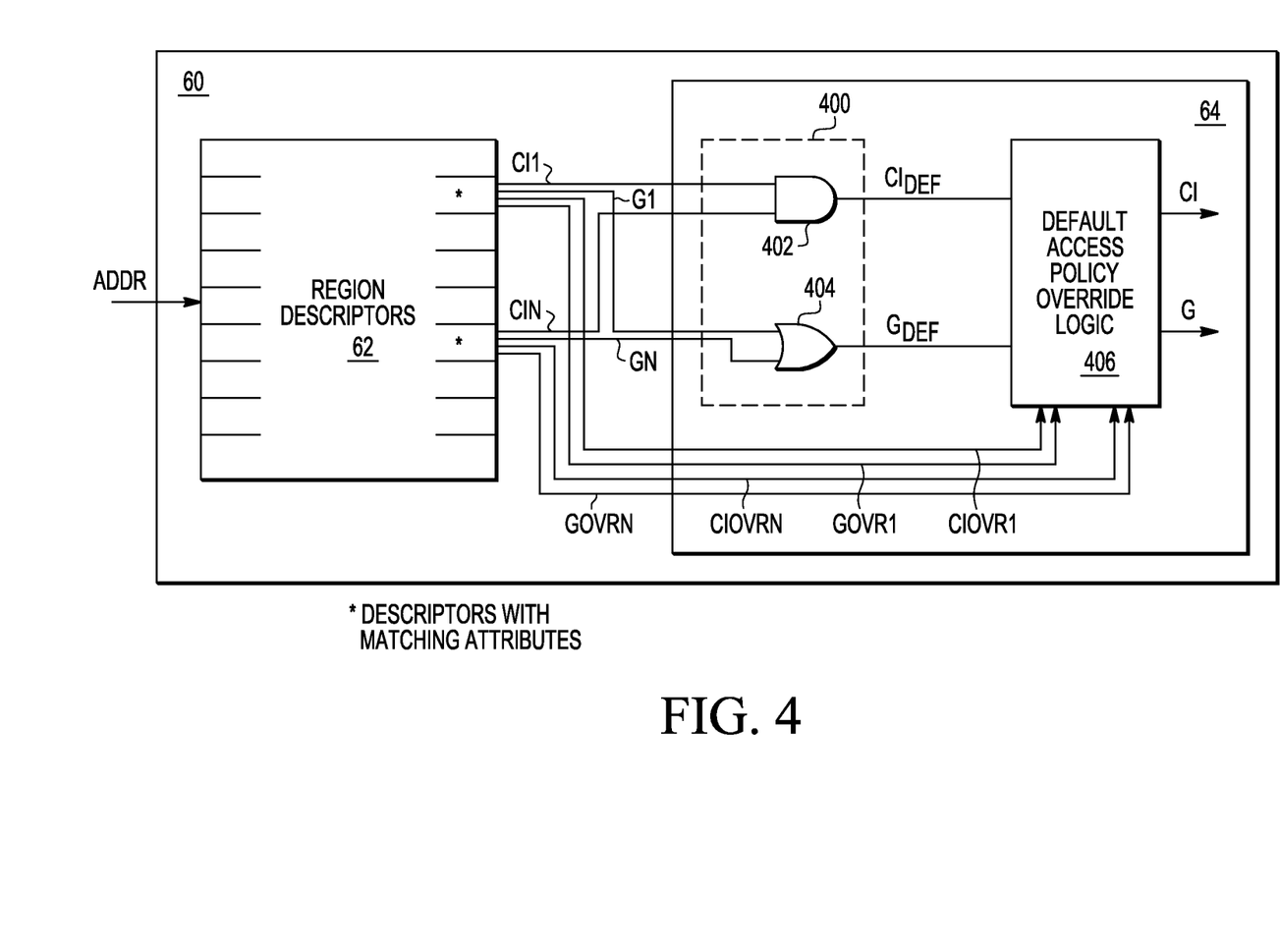
FIG. 4 is a block diagram of an embodiment of a portion of MPU control logic that can be included in the data processing system of FIG. 1.

FIG. 4 is a block diagram of an embodiment of a portion of MPU 60 that can be included in the data processing system 100 of FIG. 1 to override default memory access policies. The portion of MPU 60 shown includes region descriptors 62, default access policy logic 400, and default access policy override logic 406. MPU 64 provides access attribute information of cache-inhibited (CI) and guarded (G) to default access policy logic 400, which determines a default access policy when two or more matching region descriptors 62 are found. If the MPU 64 contains multiple matching region descriptors 62 for an access address (indicated by the region descriptors 62 with asterisks in FIG. 4 as an example), the default access policy logic 400 for combining the attributes from these matching descriptors can be such that the CI bits are AND'ed using AND logic circuit 402, resulting in the least restrictive setting for the Cache Inhibited attribute for the access, and the G bits are OR'ed using OR logic circuit 404, resulting in the most restrictive settings for the Guarded attribute for the access.

MPU 64 provides access attribute information of cache-inhibited (CI) and guarded (G) to default access policy logic 400 from each matching region descriptors 62. The override indicators CIOVR and GOVR within each region descriptor can be set when software being executed on CPU 10 (FIG. 1) writes to the region descriptors 62 (i.e., loads the region descriptors 62 into a descriptor table) when the rest of the information in the region descriptors 62 is being written including the address range, access protections, and access attributes. The values of the override attributes can be based on values for the region descriptors 62 which will allow the overall number of region descriptors 62 required for a given memory map of the system to be minimized. The memory map may either be static, i.e. not changing after exit from reset and boot software completes execution, or the memory map may change dynamically based on processes being scheduled.

MPU 64 also provides access attribute override indicators, such as cache-inhibited override (CIOVR) and guarded override (GOVR), to override logic 406 for all region descriptors for use when two or more matching region descriptors 62 are found. Default access policy logic 400 outputs the resulting default CIDEF and GDEF signals for the matching descriptors to override logic 406. If an override access attribute is set in a matching region descriptor, override logic 406 changes the final value of the overridden access attribute to match the corresponding access attribute of the matching region descriptor 62 with the override access attribute set, thus enabling one region descriptor 62 to be used to control the specific attribute for matching access requests.

Figures 5, 6:
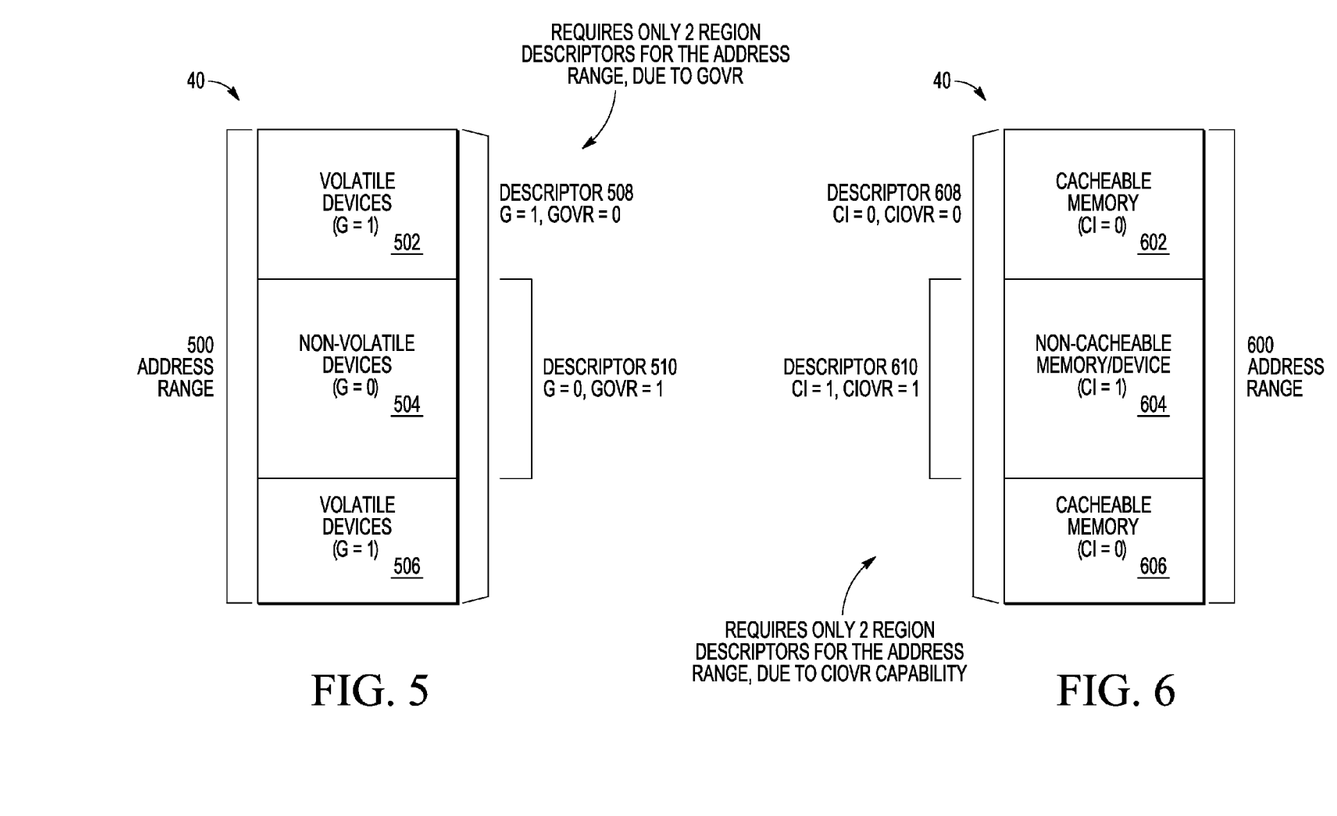
FIG. 5 is an example of memory with overlapping addresses for volatile data for which the default policy override logic can be used in the data processing system of FIG. 1 in accordance with another embodiment of the present disclosure.
FIG. 6 is an example of memory with overlapping addresses for cacheable data for which the default policy override logic can be used in the data processing system of FIG. 1 in accordance with another embodiment of the present disclosure.

FIG. 5 is an example of memory 40 with overlapping address ranges for volatile and non-volatile data for which the default policy override logic can be used in the data processing system of FIG. 1 in accordance with another embodiment of the present disclosure to reduce the number of region descriptors required to handle memory access requests to overlapping memory segments. Memory 40 with address range 500 includes adjacent memory segments 502, 504, 506. Memory segment 502 is configured for volatile devices with the guarded attribute set. Memory segment 504 is adjacent memory segment 502 and is configured for non-volatile devices with the guarded attribute cleared. Memory segment 506 is adjacent to memory segment 504 and is configured for volatile devices with the guarded attribute set. The upper and lower bound addresses for memory segments 502, 504, 506 are thus all within the address range 500 of a first region descriptor 508. The upper and lower bound addresses for memory segment 504 are between the address range bounds of region descriptor 508. Thus, using the GOVR attribute in region descriptor 510 and setting the address range of descriptor 510 to cover the memory segment 504, only two region descriptors are required for memory segments 502, 504, 506. Region descriptor 508 is used for memory segments 502, 506 and region descriptor 510 is used for memory segment 504. Without the GOVR attribute, three region descriptors would have been required, with one region descriptor for each memory segment 502, 504, 506.

FIG. 6 is another example of memory 40 with overlapping address ranges for volatile and non-volatile data for which the default policy override logic can be used in the data processing system of FIG. 1 in accordance with another embodiment of the present disclosure to reduce the number of region descriptors required to handle memory access requests to overlapping memory segments. Memory 40 with address range 600 includes adjacent memory segments 602, 604, 606. Memory segment 602 is configured for cacheable memory with the cache inhibited attribute cleared. Memory segment 604 is adjacent memory segment 602 and is configured for non-cacheable memory/device with the cache inhibited attribute set. Memory segment 606 is adjacent to memory segment 604 and is configured for cacheable memory with the cache inhibited attribute cleared. The upper and lower bound addresses for memory segments 602, 604, 606 are thus all within the address range 600 of a first region descriptor 608. The upper and lower bound addresses for memory segment 604 are between the address range bounds of region descriptor 608. Thus, with the CIOVR attribute set in region descriptor 610 and setting the address range of descriptor 610 to cover the memory segment 604, only two region descriptors are required for memory segments 602, 604, 606. Region descriptor 608 is used for memory segments 602, 606 and region descriptor 610 is used for memory segment 604. Without the CIOVR attribute, three region descriptors would have been required, with one region descriptor for each memory segment 602, 604, 606.

Figure 7:
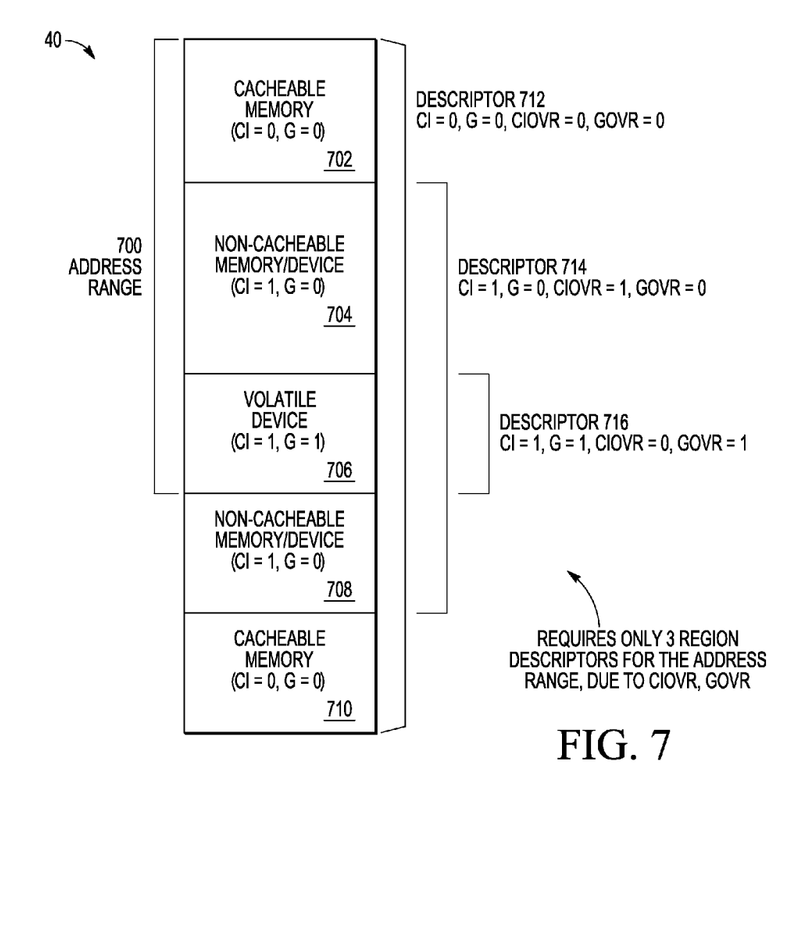
FIG. 7 is an example of memory with overlapping addresses for cacheable and volatile devices for which the default policy override logic can be used in the data processing system of FIG. 1 in accordance with another embodiment of the present disclosure.

FIG. 7 is an example of memory with overlapping addresses for cacheable and volatile devices for which the default policy override logic can be used in the data processing system of FIG. 1 in accordance with another embodiment of the present disclosure to reduce the number of region descriptors required to handle memory access requests to overlapping memory segments. Memory 40 with address range 700 includes adjacent memory segments 702, 704, 706, 708, 710. Memory segment 702 is configured for cacheable memory with the cache inhibited and guarded attributes cleared. Memory segment 704 is adjacent memory segment 702 and is configured for non-cacheable memory/device with the cache inhibited attribute set and the guarded attribute cleared. Memory segment 706 is adjacent to memory segment 704 and is configured for volatile memory device with the cache inhibited and guarded attributes set. Memory segment 708 is adjacent memory segment 706 and is configured for non-cacheable memory/device with the cache inhibited attribute set and the guarded attribute cleared. Memory segment 710 is configured for cacheable memory with the cache inhibited and guarded attributes cleared. The upper and lower bound addresses for memory segments 702, 704, 706, 708, 710 are thus all within the address range 700 of a first region descriptor 712 that has cache inhibited, guarded, cache inhibited override, and guarded override attributes cleared. A second region descriptor 714 spans memory segments 704, 706, 708 with cache inhibited and cache inhibited override attributes set, and guarded and guarded override attributes cleared. A third region descriptor 716 is used for memory segment 706 with cache inhibited, guarded, and guarded override attributes set, and cache inhibited override attribute cleared. Thus, only three region descriptors are required for memory segments 702, 704, 706, 708, 710 instead of five descriptors that would have been required without the attribute override capability.

Figures 8, 9:
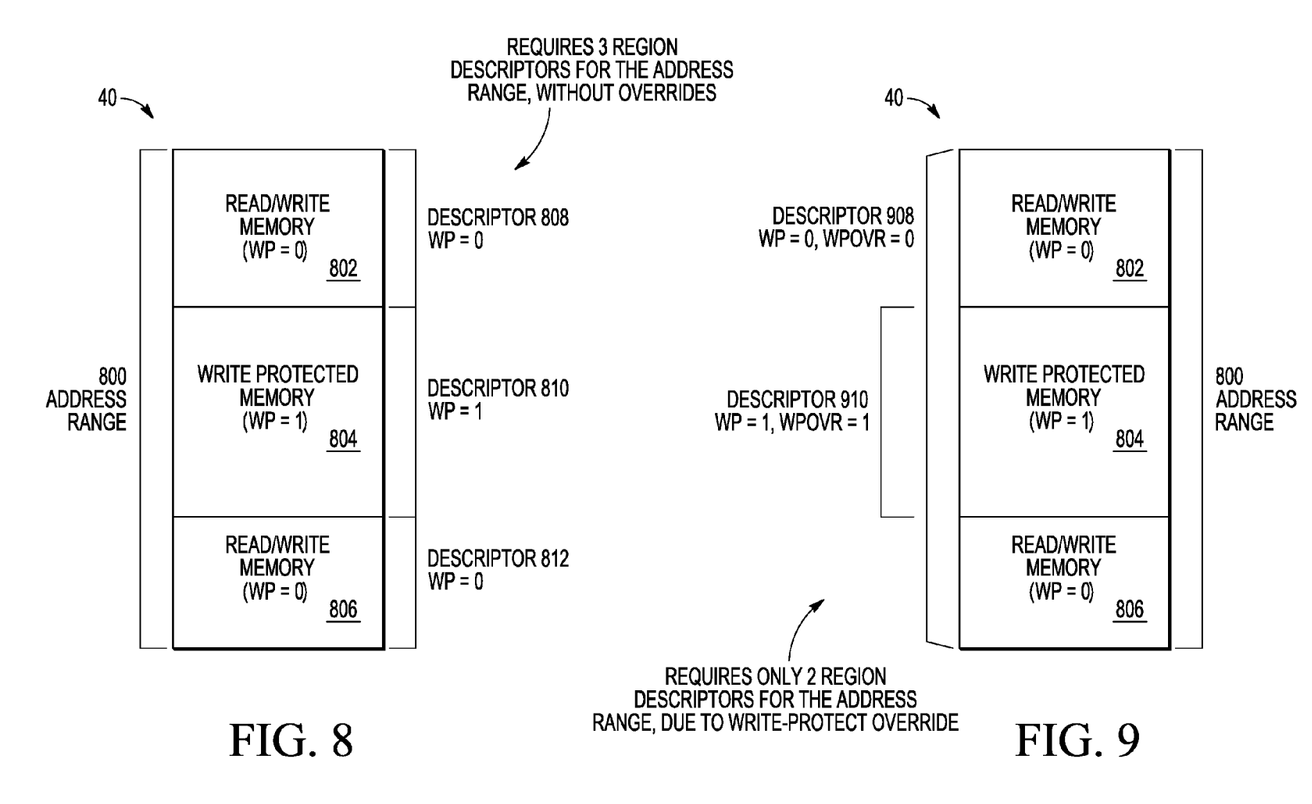
FIG. 8 is an example of read/write and write protected memory with overlapping addresses for which the default policy override logic can be used in the data processing system of FIG. 1 in accordance with another embodiment of the present disclosure.
FIG. 9 is an example of read/write and write protected memory with overlapping addresses for which the default policy override logic can be used in the data processing system of FIG. 1 in accordance with another embodiment of the present disclosure.

Override capability can be provided for other protection attributes, such as write-protect or supervisor-only attributes. FIG. 8 is an example of memory 40 with overlapping address ranges for write-protect memory for which no default policy override logic is used in the data processing system of FIG. 1. Memory 40 with address range 800 includes adjacent memory segments 802, 804, 806. Memory segment 802 is configured for read/write memory with the write-protect attribute cleared. Memory segment 804 is adjacent memory segment 802 and is configured for write-protected memory/write memory with the write-protect attribute set. Memory segment 806 is adjacent to memory segment 804 and is configured for read/write memory with the write-protect attribute cleared. The upper and lower bound addresses for memory segments 802, 804, 806 are thus all within the address range 800 of a first region descriptor 808. The upper and lower bound addresses for memory segment 804 are between the address range of region descriptor 808. Three region descriptors 808, 810, 812 are thus required for corresponding memory segments 802, 804, 806.

FIG. 9 is an example of memory 40 of FIG. 8 with overlapping address ranges for write-protect memory for which the default policy override logic can be used in the data processing system of FIG. 1 in accordance with another embodiment of the present disclosure to reduce the number of region descriptors required to handle memory access requests to overlapping memory segments. Memory 40 with address range 800 includes adjacent memory segments 802, 804, 806. Memory segment 802 is configured for read/write memory with the write-protect attribute cleared. Memory segment 804 is adjacent memory segment 802 and is configured for write-protected memory/write memory with the write-protect attribute set. Memory segment 806 is adjacent to memory segment 804 and is configured for read/write memory with the write-protect attribute cleared. The upper and lower bound addresses for memory segments 802, 804, 806 are thus all within the address range 800 of a first region descriptor 908. The upper and lower bound addresses for memory segment 804 are between the address range of region descriptor 908. Thus, with the WPOVR attribute set in region descriptor 910 and setting the address range of descriptor 910 to cover the memory segment 804, only two region descriptors are required for memory segments 802, 804, 806. Region descriptor 908 is used for memory segments 802, 806 and region descriptor 910 is used for memory segment 804. Without the WPOVR attribute, three region descriptors would have been required as shown in FIG. 8, with one region descriptor for each memory segment 802, 804, 806.

By now it should be appreciated that embodiments of systems and methods for overriding default policies for setting memory access attributes in data processing system 100 to enable overlapping memory regions have been provided. With overlapping region descriptors, default policy override logic determines permissions and memory attributes when multiple region descriptors match a given access type. The number of descriptors necessary for a particular memory map can be reduced by overriding a default access attribute policy.

In some embodiments, a data processing system comprises a processor; and a memory protection unit (MPU) coupled to the processor and having control logic. The MPU is configured to store a plurality of region descriptor entries, each region descriptor entry defining an address region, an attribute corresponding to the address region, and an attribute override control corresponding to the attribute. The control logic, in response to receiving an access request for an access to an address within an address region defined by a first region descriptor entry of the plurality of region descriptor entries and within an address region defined by a second region descriptor of the plurality of region descriptor entries, is configured to: use a default policy to determine whether to apply a value of the attribute of the first region descriptor entry or to apply a value of the attribute of the second region descriptor entry for the access when the attribute override control corresponding to the attribute of the first region descriptor entry and the attribute override control corresponding to the second region descriptor entry each have a first value; and override the default policy when the attribute override control corresponding to the attribute of the first region descriptor entry has a second value or the attribute override control corresponding to the attribute of the second region descriptor has the second value, wherein the first value is different from the second value.

In another aspect, the default policy results in selection of either a most restrictive value or a least restrictive value of the values of the attributes of the first and second region descriptor entries for the access.

In another aspect, for each region descriptor entry, the attribute is further characterized as a cache-inhibited attribute which indicates whether or not the address region defined by the region descriptor entry is cache inhibited.

In another aspect, the default policy results in selection of a least restrictive value of the cache-inhibited attributes of the first and second region descriptor entries for the access.

In another aspect, for each region descriptor entry, the attribute is further characterized as a guarded attribute which indicates whether or not the address region defined by the region descriptor entry is guarded.

In another aspect, the default policy results in selection of a most restrictive value of the guarded attributes of the first and second region descriptor entries for the access.

In another aspect, for each region descriptor entry, the attribute is further characterized as a write protect attribute and indicates whether or not the address region defined by the region descriptor entry is write protected.

In another aspect, when the attribute override control of the first region descriptor entry corresponding to the attribute has the second value, the control logic is configured to apply the value of the attribute of the first region descriptor entry for the access, and when the attribute override control of the second region descriptor entry corresponding to the attribute has the second value, the control logic is configured to apply the value of the attribute of the second region descriptor entry for the access.

In another aspect, each region descriptor entry of the MPU further comprises a second attribute corresponding to the region and a second attribute override control corresponding to the second attribute, wherein the control logic, in response to receiving the access request to the address within the address region defined by the first region descriptor entry and within the address region defined by the second region descriptor, is configured to: use a second default policy to determine whether to apply a value of the second attribute of the first region descriptor entry or to apply a value of the second attribute of the second region descriptor entry for the access when the second attribute override control corresponding to the second attribute of the first region descriptor entry and the second attribute override control corresponding to the second attribute of the second region descriptor entry each have the first value; and override the second default policy when the second attribute override control corresponding to the second attribute of the first region descriptor entry has the second value or the second attribute override control corresponding to the second attribute of the second region descriptor has the second value.

In another aspect, when the attribute override control corresponding to the attribute of the first region descriptor entry has the second value, the control logic is configured to apply the value of the attribute of the first region descriptor entry for the access, when the attribute override control corresponding to the attribute of the second region descriptor entry has the second value, the control logic is configured to apply the value of the attribute of the second region descriptor entry for the access, when the second attribute override control corresponding to the second attribute of the first region descriptor entry as the second value, the control logic is configured to apply the value of the second attribute of the first region descriptor entry for the access, and when the second attribute override control corresponding to the second attribute of the second region descriptor entry has the second value, the control logic is configured to apply the value of the second attribute of the second region descriptor entry for the access.

In another aspect, the attribute override control of the first region descriptor entry corresponding to the attribute has the second value and the second attribute override control of the second region descriptor entry corresponding to the second attribute has the second value such that the control logic, in response to the receiving the access request, is configured to apply the value of the attribute of the first region descriptor entry for the access and to apply the value of the second attribute of the second region descriptor entry for the access.

In another aspect, for each region descriptor entry, the attribute is further characterized as a cache-inhibited attribute which indicates whether or not the address region defined by the region descriptor entry is cache inhibited, and the second attribute is further characterized as a guarded attribute which indicates whether or not the address region defined by the region descriptor entry is guarded.

In other embodiments, in a data processing system having a memory protection unit (MPU) configured to store a plurality of region descriptor entries, each region descriptor entry defining an address region of a memory, an attribute corresponding to the region, and an attribute override control corresponding to the attribute, a method comprises: receiving a memory access request to a memory address of the memory; determining that the memory address is within a first address region defined by a first region descriptor entry of the plurality of region descriptor entries and within a second address region defined by a second region descriptor entry of the plurality of region descriptor entries; when neither the attribute override control of the first region descriptor entry nor the attribute override control of the second region descriptor entry indicates override is to be performed, using a default policy to determine whether to apply a value of the attribute of the first region descriptor entry or a value of the attribute of the second region descriptor entry; when the attribute override control of the first region descriptor entry indicates that override is to be performed, applying the value of the attribute of the first region descriptor entry for the memory access; and when the attribute override control of the second region descriptor entry indicates that override is to be performed, applying the value of the attribute of the second region descriptor entry for the memory access.

In another aspect, for each region descriptor entry, the attribute is further characterized as a cache-inhibited attribute which indicates whether or not the address region defined by the region descriptor entry is cache inhibited, and wherein the step of using the default policy to determine whether to apply the value of the attribute of the first region descriptor entry or the value of the attribute of the second region descriptor entry comprises selecting a least restrictive value of the cache-inhibited attributes of the first and second region descriptor entries for the memory access.

In another aspect, for each region descriptor entry, the attribute is further characterized as a guarded attribute which indicates whether or not the address region defined by the region descriptor entry is guarded, and wherein the step of using the default policy to determine whether to apply the value of the attribute of the first region descriptor entry or the value of the attribute of the second region descriptor entry comprises selecting a most restrictive value of the guarded attributes of the first and second region descriptor entries for the memory access.

In another aspect, each of the plurality of region descriptor entries further comprises a second attribute corresponding to the region and a second attribute override control corresponding to the second attribute, wherein the method further comprises: when neither the second attribute override control of the first region descriptor entry nor the second attribute override control of the second region descriptor entry indicates override is to be performed, using a second default policy to determine whether to apply a value of the second attribute of the first region descriptor entry or a value of the second attribute of the second region descriptor entry; when the second attribute override control of the first region descriptor entry indicates that override is to be performed, applying the value of the second attribute of the first region descriptor entry for the memory access; and when the second attribute override control of the second region descriptor entry indicates that override is to be performed, applying the value of the second attribute of the second region descriptor entry for the memory access.

In another aspect, the attribute override control of the first region descriptor entry indicates override is to be performed such that the value of the attribute of the first region descriptor entry is applied for the memory access and the second attribute override control of the second region descriptor entry indicates override is to be performed such that the value of the second attribute of the second region descriptor entry is applied for the memory access.

In further embodiments, in a data processing system having a memory protection unit (MPU) configured to store a plurality of region descriptor entries, each region descriptor entry defining an address region of a memory, a cache inhibited attribute corresponding to the region, and a cache inhibited attribute override control, a method comprises: receiving a memory access request to a memory address of the memory; determining that the memory address is within a first address region defined by a first region descriptor entry of the plurality of region descriptor entries and within a second address region defined by a second region descriptor entry of the plurality of region descriptor entries; when the cache inhibited attribute override control of the first region descriptor entry indicates that override is to be performed, applying the value of the cache inhibited attribute of the first region descriptor entry for the memory access regardless of the value of the cache inhibited attribute of the second region descriptor entry; and when the cache inhibited attribute override control of the second region descriptor entry indicates that override is to be performed, applying the value of the cache inhibited attribute of the second region descriptor entry for the memory access regardless of the value of the cache inhibited attribute of the first region descriptor entry.

In another aspect, when neither the cache inhibited attribute override control of the first region descriptor entry nor the cache inhibited attribute override control of the second region descriptor entry indicates override is to be performed, selecting a cache inhibited attribute value from the cache inhibited attributes of the first and second region descriptor entries which results in a least restrictive cache inhibited policy.

In another aspect, when neither the cache inhibited attribute override control of the first region descriptor entry nor the cache inhibited attribute override control of the second region descriptor entry indicates override is to be performed, selecting a cache inhibited attribute value from the cache inhibited attributes of the first and second region descriptor entries which results in a most restrictive cache inhibited policy.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A data processing system comprising:
a processor; and
a memory protection unit (MPU) coupled to the processor and having control logic, the MPU configured to store a plurality of region descriptor entries, each region descriptor entry defining an address region, an attribute corresponding to the address region, and an attribute override control corresponding to the attribute, wherein the control logic, in response to receiving an access request for an access to an address within an address region defined by a first region descriptor entry of the plurality of region descriptor entries and within an address region defined by a second region descriptor of the plurality of region descriptor entries, is configured to:

use a default policy to determine whether to apply a value of the attribute of the first region descriptor entry or to apply a value of the attribute of the second region descriptor entry for the access when the attribute override control corresponding to the attribute of the first region descriptor entry and the attribute override control corresponding to the second region descriptor entry each have a first value;

apply the value of the attribute of the first region descriptor entry for the access when the attribute override control of the first region descriptor entry corresponding to the attribute has a second value; and apply the value of the attribute of the second region descriptor entry for the access when the attribute override control of the second region descriptor entry corresponding to the attribute has the second value.

2. The data processing system of claim 1, wherein the default policy results in selection of either a most restrictive value or a least restrictive value of the values of the attributes of the first and second region descriptor entries for the access.

3. The data processing system of claim 1, wherein, for each region descriptor entry, the attribute is further characterized as a cache-inhibited attribute which indicates whether or not the address region defined by the region descriptor entry is cache inhibited.

4. The data processing system of claim 3, wherein the default policy results in selection of a least restrictive value of the cache-inhibited attributes of the first and second region descriptor entries for the access.

5. The data processing system of claim 1, wherein, for each region descriptor entry, the attribute is further characterized as a guarded attribute which indicates whether or not the address region defined by the region descriptor entry is guarded.

6. The data processing system of claim 5, wherein the default policy results in selection of a most restrictive value of the guarded attributes of the first and second region descriptor entries for the access.

7. The data processing system of claim 1, wherein, for each region descriptor entry, the attribute is further characterized as a write protect attribute and indicates whether or not the address region defined by the region descriptor entry is write protected.

8. The data processing system of claim 1, wherein each region descriptor entry of the MPU further comprises a second attribute corresponding to the region and a second attribute override control corresponding to the second attribute, wherein the control logic, in response to receiving the access request to the address within the address region defined by the first region descriptor entry and within the address region defined by the second region descriptor, is configured to:

use a second default policy to determine whether to apply a value of the second attribute of the first region descriptor entry or to apply a value of the second attribute of the second region descriptor entry for the access when the second attribute override control corresponding to the second attribute of the first region descriptor entry and the second attribute override control corresponding to the second attribute of the second region descriptor entry each have the first value; and override the second default policy when the second attribute override control corresponding to the second attribute of the first region descriptor entry has the second value or the second attribute override control corresponding to the second attribute of the second region descriptor has the second value.

9. The data processing system of claim 8, wherein:

when the attribute override control corresponding to the attribute of the first region descriptor entry has the second value, the control logic is configured to apply the value of the attribute of the first region descriptor entry for the access, when the attribute override control corresponding to the attribute of the second region descriptor entry has the second value, the control logic is configured to apply the value of the attribute of the second region descriptor entry for the access, when the second attribute override control corresponding to the second attribute of the first region descriptor entry as the second value, the control logic is configured to apply the value of the second attribute of the first region descriptor entry for the access, and when the second attribute override control corresponding to the second attribute of the second region descriptor entry has the second value, the control logic is configured to apply the value of the second attribute of the second region descriptor entry for the access.

10. The data processing system of claim 9, wherein the attribute override control of the first region descriptor entry corresponding to the attribute has the second value and the second attribute override control of the second region descriptor entry corresponding to the second attribute has the second value such that the control logic, in response to the receiving the access request, is configured to apply the value of the attribute of the first region descriptor entry for the access and to apply the value of the second attribute of the second region descriptor entry for the access.

11. The data processing system of claim 9, wherein for each region descriptor entry, the attribute is further characterized as a cache-inhibited attribute which indicates whether or not the address region defined by the region descriptor entry is cache inhibited, and the second attribute is further characterized as a guarded attribute which indicates whether or not the address region defined by the region descriptor entry is guarded.

12. In a data processing system having a memory protection unit (MPU) configured to store a plurality of region descriptor entries, each region descriptor entry defining an address region of a memory, an attribute corresponding to the region, and an attribute override control corresponding to the attribute, a method comprising:

receiving a memory access request to a memory address of the memory;

determining that the memory address is within a first address region defined by a first region descriptor entry of the plurality of region descriptor entries and within a second address region defined by a second region descriptor entry of the plurality of region descriptor entries;

when neither the attribute override control of the first region descriptor entry nor the attribute override control of the second region descriptor entry indicates override is to be performed, using a default policy to determine whether to apply a value of the attribute of the first region descriptor entry or a value of the attribute of the second region descriptor entry;

when the attribute override control of the first region descriptor entry indicates that override is to be performed, applying the value of the attribute of the first region descriptor entry for the memory access; and when the attribute override control of the second region descriptor entry indicates that override is to be performed, applying the value of the attribute of the second region descriptor entry for the memory access.

13. The method of claim 12, wherein, for each region descriptor entry, the attribute is further characterized as a cache-inhibited attribute which indicates whether or not the address region defined by the region descriptor entry is cache inhibited, and wherein the step of using the default policy to determine whether to apply the value of the attribute of the first region descriptor entry or the value of the attribute of the second region descriptor entry comprises selecting a least restrictive value of the cache-inhibited attributes of the first and second region descriptor entries for the memory access.

14. The method of claim 12, wherein, for each region descriptor entry, the attribute is further characterized as a guarded attribute which indicates whether or not the address region defined by the region descriptor entry is guarded, and wherein the step of using the default policy to determine whether to apply the value of the attribute of the first region descriptor entry or the value of the attribute of the second region descriptor entry comprises selecting a most restrictive value of the guarded attributes of the first and second region descriptor entries for the memory access.

15. The method of claim 12, wherein each of the plurality of region descriptor entries further comprises a second attribute corresponding to the region and a second attribute override control corresponding to the second attribute, wherein the method further comprises:
 when neither the second attribute override control of the first region descriptor entry nor the second attribute override control of the second region descriptor entry indicates override is to be performed, using a second default policy to determine whether to apply a value of the second attribute of the first region descriptor entry or a value of the second attribute of the second region descriptor entry;
 when the second attribute override control of the first region descriptor entry indicates that override is to be performed, applying the value of the second attribute of the first region descriptor entry for the memory access; and
 when the second attribute override control of the second region descriptor entry indicates that override is to be performed, applying the value of the second attribute of the second region descriptor entry for the memory access.

16. The method of claim 15, wherein the attribute override control of the first region descriptor entry indicates override is to be performed such that the value of the attribute of the first region descriptor entry is applied for the memory access and the second attribute override control of the second region descriptor entry indicates override is to be performed such that the value of the second attribute of the second region descriptor entry is applied for the memory access.

17. In a data processing system having a memory protection unit (MPU) configured to store a plurality of region descriptor entries, each region descriptor entry defining an address region of a memory, a cache inhibited attribute corresponding to the region, and a cache inhibited attribute override control, a method comprising:
 receiving a memory access request to a memory address of the memory;
 determining that the memory address is within a first address region defined by a first region descriptor entry of the plurality of region descriptor entries and within a second address region defined by a second region descriptor entry of the plurality of region descriptor entries;
 when the cache inhibited attribute override control of the first region descriptor entry indicates that override is to be performed, applying the value of the cache inhibited attribute of the first region descriptor entry for the memory access regardless of the value of the cache inhibited attribute of the second region descriptor entry; and
 when the cache inhibited attribute override control of the second region descriptor entry indicates that override is to be performed, applying the value of the cache inhibited attribute of the second region descriptor entry for the memory access regardless of the value of the cache inhibited attribute of the first region descriptor entry.

18. The method of claim 17, further comprising:
 when neither the cache inhibited attribute override control of the first region descriptor entry nor the cache inhibited attribute override control of the second region descriptor entry indicates override is to be performed, selecting a cache inhibited attribute value from the cache inhibited attributes of the first and second region descriptor entries which results in a least restrictive cache inhibited policy.

19. The method of claim 17, further comprising:
 when neither the cache inhibited attribute override control of the first region descriptor entry nor the cache inhibited attribute override control of the second region descriptor entry indicates override is to be performed, selecting a cache inhibited attribute value from the cache inhibited attributes of the first and second region descriptor entries which results in a most restrictive cache inhibited policy.

\* \* \* \* \*